3,775,437
1,3,3-TRIMETHYL-7-OXABICYCLO[4.1.0]
HEPTANE-2,5-DIONE
Donald L. Roberts and Bonita P. Hege, Winston-Salem,
N.C., assignors to R. J. Reynolds Tobacco Company,
Winston-Salem, N.C.
No Drawing. Filed Jan. 4, 1972, Ser. No. 215,427
Int. Cl. C07d 1/06, 1/00
U.S. Cl. 260—348 C
1 Claim

ABSTRACT OF THE DISCLOSURE

Synthesis of the new composition of matter, 1,3,3-trimethyl-7-oxabicyclo[4.1.0]heptane-2,5-dione.

The present invention relates to a new composition of matter and the synthesis thereof.

The new composition of matter of the present invention is designated chemically as 1,3,3 - trimethyl - 7-oxabicyclo[4.1.0]heptane - 2,5 - dione and has the following structural formula:

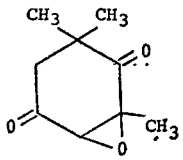

The above compound of this invention finds particular utility in the preparation of 2-hydroxy - 3,5,5 - trimethyl-2 - cyclohexen - 1,4 - dione, which latter compound is useful as a tobacco additive as disclosed and claimed in U.S. Pat. No. 3,730,189 of Wilmer A. Rohde.

The compound of this invention can be synthesized from isophorone. According to the synthesis procedure, isophorone is converted to 4-ketoisophorone by the method of Marx and Sondheimer described in Tetrahedron Suppl. 8, Part I, pp. 1–7 (1966). Epoxidation of the 4-ketoisophorone yields the new compound of this invention. This synthesis is carried out as follows:

A solution of 28 grams of 4-ketoisophorone, 57.6 milliliters of 30% hydrogen peroxide, and 150 milliliters of methanol was cooled to 15° C. Sodium hydroxide (6 N, 16.6 milliliters) was added dropwise with stirring keeping the temperature of the reaction below 20° C. Stirring was continued for 3.5 hours and then the solution was poured into 300 milliliters of water and extracted with ether. The ether solution was washed with water, dried over anhydrous magnesium sulfate and concentrated in vacuo to give 30 grams of an oil which was characterized as 1,3,3-trimethyl - 7 - oxabicyclo[4.1.0] heptane -2,5-dione.

Infrared spectrum: 5.85, 6.82, 6.92, 7.19, 7.33, 7.75, 8.05, 8.59, 9.00, 9.30, 9.48, 10.08, 10.50, 10.88, 11.40, 11.65, 12.20, 12.67, and 13.12μ.

Nuclear magnetic resonance spectrum: τ 8.92 (3), 8.70 (3), 8.45 (3), 6.48 (1), 7.74 (1, doublet, J=16.6 cps.), and 6.93 (1, doublet, J=16.6 cps.).

Analysis calculated for $C_9H_{12}O_3$: 168. Found: M/e 168 (mass spectrum).

The compound of the present invention can be converted to the tobacco additive 2-hydroxy - 3,5,5 - trimethyl - 2 - cyclohexen 1 1,4 - dione by acid or base hydrolysis. For example, 30 grams of the above-described epoxide was placed in 250 milliliters of 20% sulfuric acid containing 50 milliliters of ethanol. This mixture was heated at reflux temperatures for 24 hours and was then cooled. The product was extracted with chloroform to give 25 grams of oil which, on cooling, yielded 7.5 grams of crystalline 2-hydroxy - 3,5,5 - trimethyl - 2 - cyclohexen-1,4-dione, melting point 134–136° C.

Those modifications and equivalents which fall within the spirit of the invention are to be considered a part thereof.

What is claimed is:
1. 1,3,3-trimethyl - 7 - oxabicyclo[4.1.0]heptane-2,5-dione.

References Cited

D. H. Williams et al., Jour. Org. Chem., vol. 33 (3), pp. 998–1002 (1968).

NORMA S. MILESTONE, Primary Examiner

U.S. Cl. X.R.
260—586 R

UNITED STATES PATENT OFFICE
CERTIFICATE OF CORRECTION

Patent No. 3,775,437               Dated November 27, 1973

Inventor(s) Donald L. Roberts and Bonita P. Hege

It is certified that error appears in the above-identified patent and that said Letters Patent are hereby corrected as shown below:

Column 2, line 21, "cyclohexen 1 1,4-dione" should read

-- cyclohexen-1,4-dione --

Signed and sealed this 9th day of April 1974.

(SEAL)
Attest:

EDWARD M.FLETCHER,JR.                 C. MARSHALL DANN
Attesting Officer                     Commissioner of Patents